C. P. STEINMETZ.
THERMOREGULATOR.
APPLICATION FILED JUNE 26, 1917.

1,276,589.

Patented Aug. 20, 1918.

Inventor:
Charles P. Steinmetz,
by
His Attorney.

PITI# UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

THERMOREGULATOR.

1,276,589.

Specification of Letters Patent.   Patented Aug. 20, 1918.

Application filed June 26, 1917. Serial No. 176,965.

*To all whom it may concern:*

Be it known that I, CHARLES P. STEINMETZ, a citizen of the United States, residing at Schenectady, in the county of Schenectady, State of New York, have invented certain new and useful Improvements in Thermoregulators, of which the following is a specification.

My invention relates to the temperature control of a device which in its operation evolves heat and it has for its object the improvement of a device of this character.

The device, the temperature of which is to be controlled in accordance with my invention, may be one whose function is the production of heat, or it may be one in which the production of heat is incidental.

Figure 1:
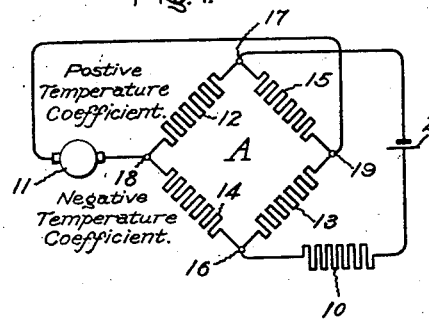
Figure 2:
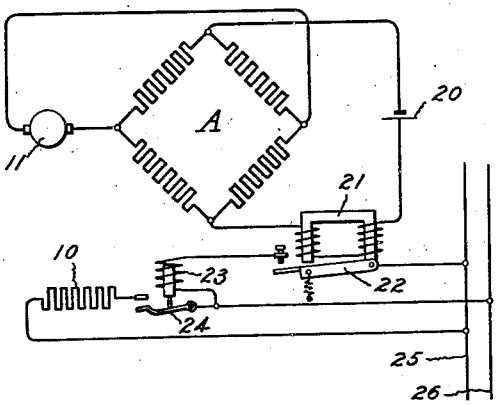
Figure 3:
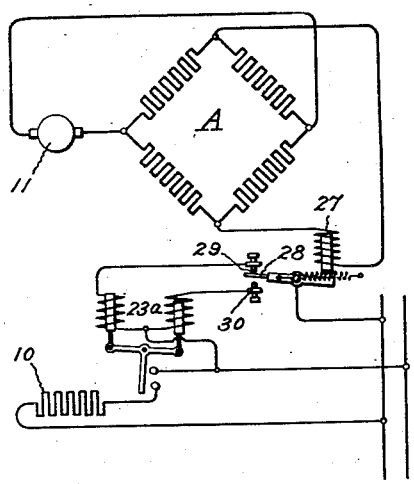
Figure 4:
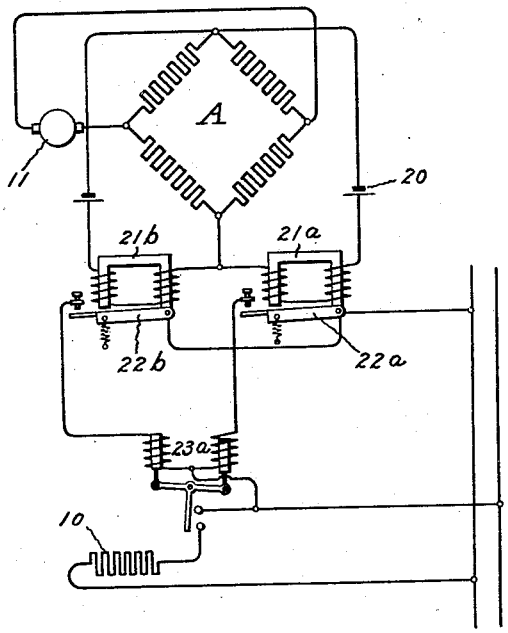
Figure 5:
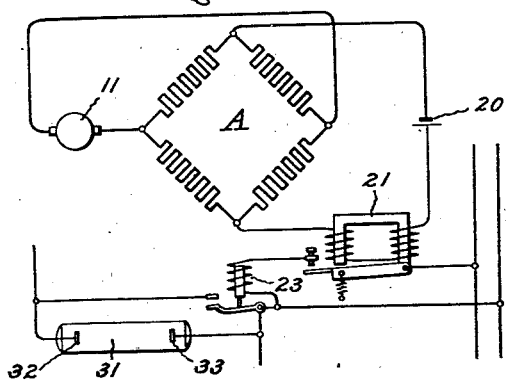

My invention will best be understood by reference to the accompanying drawings, in which, Figure 1 is a diagrammatic view showing one embodiment of my invention applied to the control of a heating device; Figs. 2, 3 and 4 are modifications of Fig. 1; and Fig. 5 is a diagram showing my invention used for controlling the temperature of a vacuum lightning arrester.

Referring now to the drawings, and first to Fig. 1, 10 is a device the temperature of which is to be controlled as for example an electric heater. The electric heater is supplied with current from a generator 11, through a Wheatstone bridge A, two of the opposite resistance legs of which 12 and 13 have a given temperature coefficient, while the remaining two legs 14 and 15 have a different temperature coefficient from the legs 12 and 13; preferably legs 12 and 13 have a positive temperature coefficient and may be made for instance of iron, and the legs 14 and 15 a negative temperature coefficient, and may be formed of a material such as silicon or may be made of an electrolyte. The junction points of the various resistances are indicated by the numerals 16, 17, 18 and 19. All of the resistance elements of the Wheatstone bridge are externally affected by the heat evolved by the heating device, and are intended to maintain the temperature thereof substantially constant. It will, of course, be understood that, strictly, it is the temperature of the space surrounding the heating device whose temperature is controlled; but since this is a function of the temperature of the heating device, I have, for convenience, referred to the arrangement as controlling the temperature of the device itself. The elements of the Wheatstone bridge are so arranged that, at the temperature which they attain when the heating device is operated at the desired temperature, their resistances are substantially equal. Assuming now that the temperature of the heating device and correspondingly that of the resistance elements of the Wheatstone bridge is below that at which the device is intended to operate, then the resistances of the elements 12 and 13 of the Wheatstone bridge having a positive temperature coefficient will be low as compared with the resistances of the elements 14 and 15 which have a negative temperature coefficient. Assuming further that the positive terminal of the generator is the one adjacent to the Wheatstone bridge, then, since the drop in voltage across the resistances having the positive temperature coefficient is less than the drop across the resistances having the negative temperature coefficient, the point 17 will be at a higher voltage than the point 16, and a current will flow from the terminal 17 to the terminal 16 through the heating element 10 and raise the temperature thereof and correspondingly raise the temperature of the elements of the Wheatstone bridge. Current will continue to flow through the heating device and the temperature thereof, as well as that of resistance elements themselves will continue to rise until there is no voltage, or practically no voltage between the points 17 and 16 which will be the temperature at which it is desired to operate the heating device. Preferably a unidirectional cell 20, such for instance as aluminum-carbon, is included in the local circuit of the heating device which is so arranged that current passes freely therethrough in one direction, in order to raise the temperature of the heating device to the desired point, but prevents passage of current in the opposite direction in case there should be any such tendency due to the heating device attaining a temperature above that at which it is desired to operate.

With the arrangement here described, the temperature of the space surrounding the heater is kept below a predetermined value. It will be apparent, however, that by suitably arranging the various elements, the same arrangement may be used to maintain the temperature of the heating device above a predetermined value. In this case with the temperature normally above the predetermined value no current will flow through the heating device, but when the temperature falls below this value then current will flow and the temperature of the device be maintained above predetermined minimum. One application of this latter arrangement is in the heating of aluminum cell lightning arresters which are placed in out door substations or in such exposed positions that there is danger of their freezing. In this case the unidirectional cell and coöperating elements would be so arranged that when the temperature of the space surrounding the arrester was above freezing no current would flow through the heater, and as soon as it dropped below freezing, current would flow therethrough.

The system shown in Fig. 2 operates similarly to that shown in Fig. 1, but in this case the heating device 10 is controlled by a relay 21 which is included in the local circuit derived from the Wheatstone bridge, the armature 22 of which controls the circuit to the heating device in this case through another relay 23 and its armature 24, the heating device being connected to a separate supply circuit which is indicated by the reference numerals 25 and 26.

In the arrangement shown in Fig. 3, the heating device is controlled by a polarized relay 27 included in the local circuit derived from the Wheatstone bridge, the magnetic armature of which carries a contact which makes contact with either of two stationary contacts 29 or 30, controlling circuits to two magnets of the relay 23ª which are designed to positively open and close the circuit of the heating device. In this case, no unidirectional cell is included in the local circuit derived from the Wheatstone bridge, and when the device is below a predetermined temperature, current will flow through the relay 27 in one direction to attract the armature and throw the contact 28 into engagement with the contact 30 and thus close the circuit of the heating device, whereas when the heating device is above the desired temperature, current will flow through the polarized relay 27 in the opposite direction and repel the armature and bring the contact 28 into engagement with the contact 29 and thus open the circuit of the heating device, the armature being held in either extreme position by a light over centering spring as shown.

In the modification shown in Fig. 4, the heating element 10 is controlled by two relays 21ª and 21ᵇ, included in two different circuits derived from the Wheatstone bridge. The relay 21ª through its armature 22ª controls one leg of the relay 23ª and closes the switch for the circuit of the heating device 10 when the same is energized, while the relay 21ᵇ correspondingly opens the circuit thereof.

My invention is useful not only for controlling the temperature of a heating device, but may be used for controlling the temperature of a device in which the production of heat is incidental, and thus prevent injury thereto. In Fig. 5 I have illustrated my invention in connection with a vacuum lightning arrester. As is well known, these devices sometimes become overheated, due to a continuous discharge, and the arrangement here shown is utilized to close a short circuit around the arrester under such conditions. The control is effected by a relay 21 included in a local circuit derived from the Wheatstone bridge A in precisely the same manner as described in connection with Fig. 2. When the lightning arrester reaches a predetermined temperature, and correspondingly the elements of the Wheatstone bridge which are subjected to the temperature of the lightning arrester, a sufficient current will pass through the relay 21 to actuate the same, and through the relay 23 close a shunt around the vacuum lightning arrester 31, provided with the usual electrodes 32 and 33, which are connected to conductors in any desired circuit, such as a telephone system.

While I have described my invention as embodying a concrete structure and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In combination, a device which develops heat during its operation, a source of energy connected to said device, and means for controlling the energy supplied to said device comprising resistances having different temperature coefficients and which are affected by the heat developed by said device, the resistances being balanced at a predetermined temperature.

2. In combination, a device which develops heat during its operation, a source of electrical energy, and means for controlling the energy supply to said device comprising a Wheatstone bridge, the legs of which are formed of resistances having different temperature coefficients, all of the resistances of the Wheatstone bridge being subjected to the temperature of said device and the resistances being balanced at a predetermined temperature.

3. In combination, a device which develops heat during its operation, a source of energy connected to said device, and means for controlling the energy supply to said device comprising a Wheatstone bridge two of the opposite elements of which have a positive temperature coefficient and the other resistance elements a negative temperature coefficient, the resistances being balanced at a predetermined temperature.

4. In combination, an electric heating device, a source of electric energy supply connected thereto, and means comprising a Wheatstone bridge, two of the opposite legs of which have a temperature coefficient different from that of the remaining two, for controlling the energy supplied to said device.

5. In combination, an electric heating device, a source of electric energy supply connected thereto, and means comprising a Wheatstone bridge, two of the opposite legs of which have a positive temperature coefficient and the remaining two a negative temperature coefficient for controlling the energy supplied to said device.

6. In combination, a device which develops heat during its operation, a source of energy connected to said device, and means for controlling the energy supplied to said device comprising a Wheatstone bridge, two of the opposite legs of which have a positive temperature coefficient and the remaining two a negative temperature coefficient, and a circuit including a unidirectional cell connected to opposite junction points of the Wheatstone bridge.

In witness whereof, I have hereunto set my hand this 25th day of June, 1917.

CHARLES P. STEINMETZ.